Patented Jan. 20, 1942

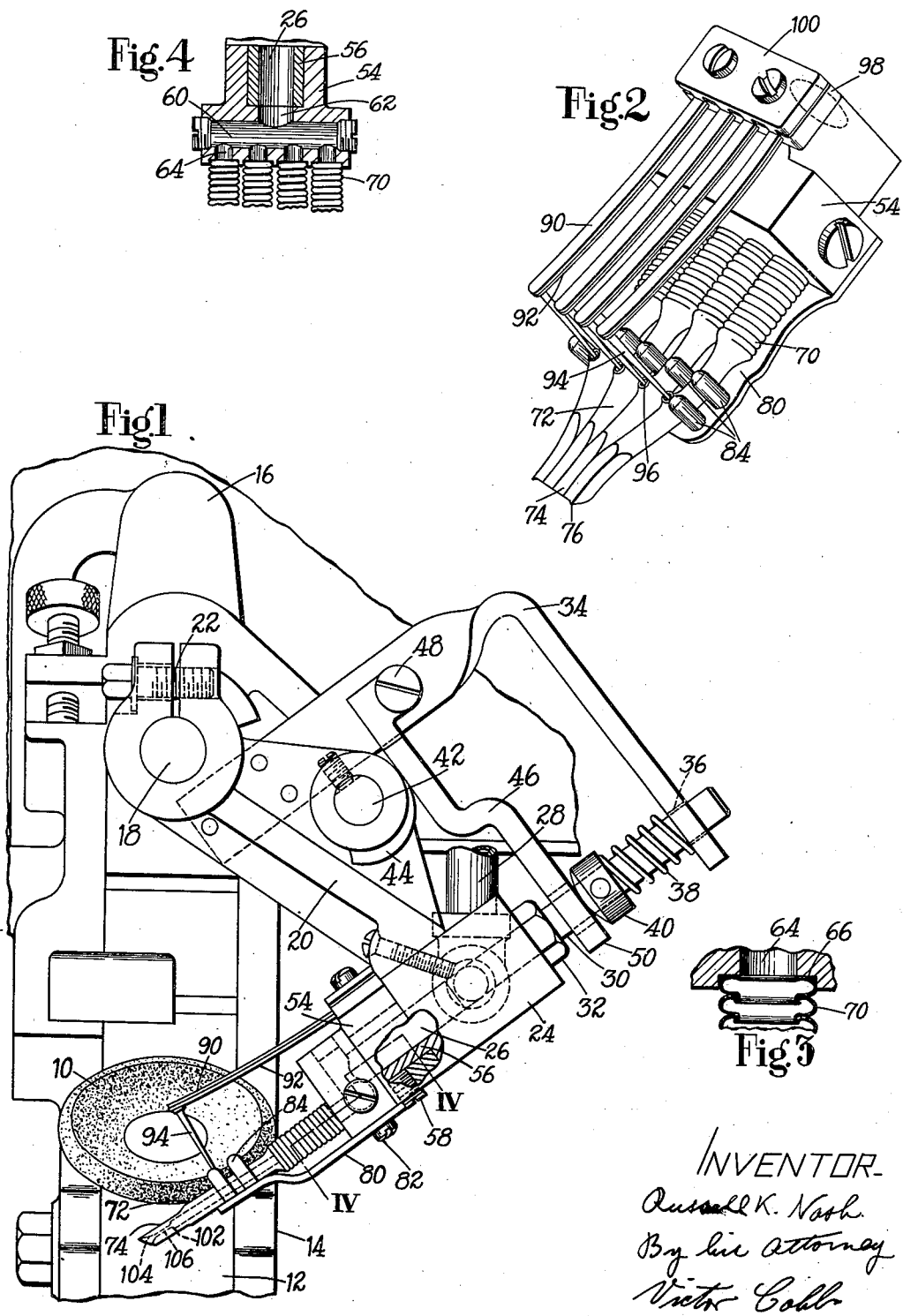
Jan. 20, 1942.  R. K. NASH  2,270,463
FLEXIBLE NOZZLE
Filed Jan. 5, 1940

2,270,463

UNITED STATES PATENT OFFICE 2,270,463

FLEXIBLE NOZZLE

Russell K. Nash, Brookline, Mass., assignor to B. B. Chemical Co., Boston, Mass., a corporation of Massachusetts Application January 5, 1940, Serial No. 312,539

3 Claims. (Cl. 91—43)

This invention relates to coating apparatus and is herein illustrated as embodied in a nozzle for a machine for applying a stripe of coating material such as cement to the bottoms of shoes and of the type illustrated in Letters Patent of the United States No. 2,100,341, granted November 30, 1937, on an application of W. L. MacKenzie.

When the surface of the work which is to be coated is irregular and may contain wrinkles, staples, and the like, then in order to lay a uniform stripe of cement, it becomes necessary to employ a flexible nozzle, one successful form of which is made of rubber and is illustrated in the above-mentioned patent. Difficulties due to the rapid wearing out of the rubber nozzle by reason of the abrasion of the work have been corrected in the metal nozzle shown in Letters Patent of the United States No. 2,177,666, granted October 31, 1939, upon the application of W. L. MacKenzie.

An object of the present invention is to provide an improved nozzle of the metal type which shall be simpler and cheaper in construction and which may be employed successfully in extruding adhesive coating materials of relatively low viscosity.

A feature of the invention will be recognized in the emploment of flexible, helically-wound, metallic tubing as an integral portion of each of a plurality of delivery members employed in the nozzle. Other features relating to the support of these members and the manner of holding them in resilient contact with the work will be made clear in the following specification, accompanying which is a drawing, in which Fig. 1 is an end elevation of the head of a machine of the type shown in said patents, to which is applied my improved nozzle;

Fig. 2 is an angular view of the nozzle after it has been removed from the machine;

Fig. 3 is an axial section through a portion of the flexible metallic tubing embodied in each of the delivery members; and Fig. 4 is a section on the line IV—IV of Fig. 1 to show the supply passage through which the coating fluid is distributed to the various delivery members.

As in machines of the type illustrated in the MacKenzie Patent No. 2,100,341, used for cementing shoe bottoms to which soles are to be attached by cement, a rubber-tired feed wheel 10 for engaging the side of an inverted shoe is journaled in a member 12 supported between the sides of a frame 14. On this frame there is an adjustable nozzle carrier 16 having an outwardly extending rod 18 to which a nozzle arm 20 is held by means of a clamp 22. Attached to the lower end of this arm 20 is a block 24 having a supply passage 26 to which cement under pressure is conducted from a receptacle (not shown) by means of a pipe 28.

In order that the operator may readily shut off the supply of cement as each piece of work is withdrawn from the machine and turn it on again for the next piece of work, a valve rod 30 is slidably mounted in the passage 26 and extends far enough into said passage, as determined by a limit nut 32, to cut off the supply of cement delivered through the pipe 28. A bracket 34 attached to the nozzle-supporting arm 20 is apertured at 36 to guide the upper end of the rod 30 and to serve as an abutment for a compression spring 38 surrounding that rod and bearing against a collar 40 thereon. This spring moves the valve rod to the closed position shown in Fig. 1. When the operator wishes to open the valve, he turns a shaft 42 by means of a connection to a treadle (not shown). This shaft is journaled in the arm 20 and is provided with a cam 44 adapted to engage the under side of a lever 46. The lever 46 is pivoted at 48 on the bracket 34 and at its outer end 50 surrounds the valve rod 30 and underlies the collar 40.

The nozzle itself is built upon a supporting block 54 the upper part of which is recessed to fit over a neck 56 extending downwardly from a block 24, and the nozzle is held in place on this neck by a set screw 58. The block 54 is also provided with an equalizing chamber 60 (Fig. 4) with which is associated an inlet passage 62 leading to the supply passage 26 and outlet passages 64 emerging in recesses 66 (Fig. 3) in which there are soldered the ends of flexible metallic hoses 70. Various flexible hoses may be utilized, but the particular one which is shown in the drawing is made up of a continuous strip having an S-shaped cross-section wound helically so that the adjacent edges of the strip interlock, thus forming a joint which is liquid tight but which still permits the ready flexing of the hose. The amount of flexing movement of any portion of the metal is so small that there is no danger of crystallization of the metal or that it will be bent beyond its elastic limit.

Each of the pieces of metallic hose 70 is joined to one of several hollow delivery members 72, which are bent to bring the lower or outlet ends 74 closely adjacent to one another. These lower ends 74 are rectangular in cross-section, and the two outer delivery members are provided with lips

76 (Fig. 2) which assist in preventing the lateral spread of the stripe of coating material which is applied. It will be clear that, by reason of the flexibility of the hose connections 70, the outlet ends of the various delivery members are supported by said connections for movement up and down to conform with the irregularities of the bottom of a shoe held in inverted position and pressed up into contact therewith. The lowermost position of these delivery members is determined by a supporting plate 80 secured by screws 82 to the under side of the block 54. It will be observed from Fig. 1 that this plate is bent so that the delivery members engage only the lower end portion of it, on which are mounted guide studs 84 which prevent lateral deflection of the delivery members and guide the up-and-down movements thereof.

The outlet ends of the delivery members 74 are held in engagement with the work by means of leaf springs 90, 92 which are shown as arranged in pairs, with the lower springs provided with pins 94 which are received in sockets 96 formed upon the upper side of the delivery members and preventing accidental displacement of the pins with respect to said members and minimizing the friction between the springs and the delivery members. The leaf springs are held in the grooves of a lower clamp plate 98 by means of depending ribs on the lower side of an upper clamp plate 100. These clamp plates are attached by screws to the block 54 and facilitate the ready assembly of the springs for the nozzle or the repair thereof.

It will be noted that the passage extending through the delivery hose, and also through the major portion of the length of each delivery member down to point 102, is of substantial diameter, permitting the use of low pressure for extruding the coating material. The outlet openings 104 are bell-shaped or conical in shape to reduce the velocity at the point of delivery and are joined to the passages which terminate at 102 by short constricted passages 106, thus preventing dripping of such portions of the coating material as remain within the nozzle when the valve 30 is shut. At the same time, the skin friction resulting from the short passages 106 is negligible. By reason of the bell-shaped outlet openings, the individual stripes of cement applied will be close together and merge readily so as to form a single band upon the work.

Having thus described my invention, what I claim as new and desire to secure by Letters Patent of the United States is:

1. In an extruding apparatus, a nozzle comprising a plurality of rigid, yieldably mounted delivery members provided with passageways each of substantial diameter throughout the greater portion of its length and terminating in a bell-shaped mouth, the passageway between said mouth portion and the main portion having a diameter less than that of either portion and being constricted to an extent where dripping will be prevented, said delivery members cooperating to apply merging stripes of coating material upon an irregular surface, a supporting member having a supply passage, and pieces of flexible metallic hose for connecting each of said delivery members to said supply passage, said hose including a helically wound metallic strip.

2. In an extruding apparatus, a nozzle having a supporting block provided with a supply passage, a plurality of rigid depending delivery members the outlet ends of which are positioned closely adjacent to one another and are individually yieldable toward and away from the work so that they drag upon the work presented thereto to deliver narrow stripes of coating material which merge to form a wide band, the supply ends of said members being individually connected to said supply passage by hollow flexible members which permit this yielding movement and provide a support for each delivery member as it moves bodily under the influence of the irregular surface of the work, means for guiding up-and-down movements of the delivery members adapted to limit the downward movement thereof, and resilient members urging said delivery members toward said limit.

3. In an extruding apparatus, a nozzle comprising a supporting block, a plurality of delivery members provided with laterally disposed sockets, said members being connected to said block for movement of the outlet ends thereof, means for guiding up-and-down movements of said members, and flat springs overlying the delivery members, said springs being secured at one end to said block and provided near their free ends with pins resting in said sockets, thereby to resist upward movement of the outlet ends of the delivery members.

RUSSELL K. NASH.